Patented July 18, 1944

2,353,946

UNITED STATES PATENT OFFICE 2,353,946

PROCESS OF PREPARING SOFT CURD MILK

Arnold B. Storrs, Torrington, Conn., assignor to American Seal-Kap Corporation of Delaware, Wilmington, Del., a corporation of Delaware No Drawing. Application July 14, 1941, Serial No. 402,430

2 Claims. (Cl. 99—60)

This invention relates to a process of preparing a soft curd milk by the controlled action of a small amount of pancreatic enzyme and has for an object to provide an efficient and commercially practical means for controlling the action of the pancreatic enzymes in a manner suited to obtain the desired result.

The Conquest Patent 2,115,505 described a process of this general type in which about one pound of mixed pancreatic enzymes or pancreas solution is added for each 5000 lbs. to 40,000 lbs. of milk, depending upon the original curd tension of the milk and the activity of the enzymes. The enzymes, in accordance with Conquest, are allowed to act at a temperature between 40° F. and 105° F. for a period of from 24 hours to 15 minutes suited to reduce the curd tension to a value not exceeding about 25 grams, as measured on the Hill Curdometer, after which the milk is heated to a pasteurizing temperature of about 145° F. to inactivate the enzymes before any substantial hydrolysis or digestion of the casein of the milk occurs. The process is intended to soften the curd of the milk without digestion thereof and without carrying hydrolysis to the stage of protese and peptone formation with the consequent development of bitter flavor.

The term "soft curd milk" as applied here is intended to include milk which has been produced, processed or modified in such a manner as to have enhanced characteristics of digestibility. While the curd tension test is at present the only generally recognized in vitro procedure for assaying such characteristics, the application of this treatment to milk is not to be limited necessarily on the basis of curd tension reduction. Fundamentally, the purpose of this treatment of milk with pancreatic enzyme is to improve the digestibility of the milk, regardless of whether such improvement be measured by the curd tension test or some other procedure. While milk with a curd tension of about 30 grams or lower is now considered as "soft curd milk" it is to be understood that the establishment of other or different in vitro standards of digestibility in the future would not limit the application of this process.

The present invention is an improvement and a modification of the process set forth in the Conquest patent, which renders the process suited to various conditions encountered in commercial use.

More specifically, I have found that the treatment of milk with a pancreatic enzyme as described in the Conquest patent is dependent upon two things; first, conditions of time and temperature which favor enzyme activity, and, secondly, conditions of time and temperature which bring about adequate inactivation of the enzymes, thus permitting control of the amount of treatment.

With respect to the action of the pancreatic enzyme, the rate of activity varies with the temperature. It is very low at 40° F., for example, and increases as the temperature is raised up to the point where inactivation by heat is both instantaneous and complete. For all practical purposes it may be said that inactivation of the enzymes by heat is so rapid at about 165° F. that little effective action of the enzymes takes place at or above that temperature.

The inactivation of pancreatic enzyme is accomplished by heat and starts in milk at a temperature of about 120° F. The degree or completeness of inactivation is dependent upon the length of time during which the milk is exposed to the inactivating temperature. At 120° F., for example, the rate of inactivation is extremely low while as the temperature is raised the degree of inactivation increases, becoming quite rapid at 160° F. However, there is some evidence to indicate that even momentary heating to a temperature of 212° F. may not completely inactivate the enzymes. For practical purposes, though, the inactivation need not be complete but must only be thorough enough to reduce the activity of the pancreatic enzyme to a point such that the keeping quality of the milk under normal handling conditions will not differ greatly after treatment from that of untreated milk.

As stated above, the rate of activity of pancreatic enzyme increases as the temperature is raised. Also, heat inactivation starts at about 120° F. and increases in degree as the temperature is raised. Thus, at 120° F. or higher these two factors are morking against each other. This affects the overall rate of enzyme activity in a manner as follows: The effective amount of enzyme activity is low at temperatures of 50° F. to 60° F. or lower, increases as the temperature is raised and reaches a peak at about 120° F. to 130° F., after which it decreases with a further rise in temperature, becoming practically negligible at temperatures of 160° F. to 165° F. or higher.

The effect of time is of the utmost importance in the treatment of milk by this process. In general, at temperatures below 120° F. to 130° F. an increase in the length of time of exposure of the milk to enzyme activity increases the effectiveness of a given amount of the pancreatic enzyme, or, in other words, makes it possible to achieve the same results with a smaller amount of enzyme. At temperatures higher than about 120° F. to 130° F., the predominant effect of an increase in the time of exposure is an increase in the amount or degree of enzyme inactivation.

There is no exact line of division which separates conditions favoring enzyme activity from those which do not favor it or cause inactivation. On the contrary, conditions of time and temperature which promote the activity of pancreatic enzyme overlap the conditions which cause inactivation to a very considerable extent. This makes it possible, therefore, to process milk by this method in an almost infinite variety of treatments.

For example, for the improvement in digestibility to a point measured by a curd tension of 30 grams, it would be possible to add the enzyme to milk at a temperature below 60° F., allow it to incubate there for a period of up to 24 hours, then heat the milk to, say, 130° F. and allow it to incubate again for a period of a few minutes, and then continue heating and pasteurize at a temperature of 160° F.–162° F. for fifteen to twenty seconds. The milk could also be treated by adding the enzyme at a temperature below 105° F. and then heating immediately to pasteurizing temperature with no static incubation period, relying instead for incubation upon the usual heating period and the process of pasteurization itself. Or, in still another manner, the enzyme could be added to the milk after it had been heated to, say, 143° F., then held at that temperature for 30 minutes, at least, thus achieving the desired amount of enzyme activity and satisfactory enzyme inactivation simultaneously with pasteurization. Numerous other variations could also be made, and in the commercial application of the process various combinations of time and temperature within the range specified may be employed.

Various specific examples of methods of treatment to improve the digestibility to the extent required to obtain soft curd milk having a curd tension of 30 grams or less are as follows:

*Example 1*

Pancreatic enzyme is added to the milk in the proportion of 1 lb. of enzyme for about 5,000 to 40,000 lbs. of milk, depending upon the initial curd hardness and activity of the enzymes at a temperature below 105° F. The milk is then heated to a temperature between 105° F. to 165° F., incubated for a period of time sufficient to give the desired amount of enzyme activity at that temperature to reduce the curd tension to about 30 grams, and is then heated further, if necessary, to obtain inactivation of the enzyme.

*Example 2*

The enzyme as above may be added to milk at a temperature of from 32° F. to 165° F. and the milk immediately heated to a temperature and for a period of time sufficient to produce satisfactory inactivation, relying upon the period of heating prior to such inactivation as the incubation period for the enzyme activity to reduce the curd tension to the desired value.

*Example 3*

The enzyme as above may be added to milk at a temperature of from 130° F. to 165° F., and the milk held at that temperature for a sufficient length of time to achieve satisfactory enzyme action and to produce enzyme inactivation simultaneously therewith, relying upon the progressively decreasing action of the enzyme held at the above temperatures to produce the desired improvement in digestibility.

*Example 4*

The enzyme as above may be added to milk at about a temperature of 142° F. to 145° F. and held at that temperature for at least 30 minutes, thus obtaining the desired amount of activity and satisfactory inactivation simultaneously.

*Example 5*

The enzyme as above may be added to milk at a temperature of from 32° F. to 70° F. and the milk held at that temperature for a period up to 24 hours, then heated between 105° F. and 160° F. and again incubated for a period up to fifteen minutes, after which the milk may be heated to a temperature and for a time sufficient to pasteurize the milk, the pasteurization, together with the incubation period serving to inactivate the enzymes.

*Example 6*

The enzyme as above may be added to milk at a temperature of from 32° F. to 70° F., the milk held at that temperature for a period up to 24 hours, then heated to 130° F. to 140° F., again incubated for a period of about 5 minutes and then heated to a temperature and for a time sufficient to pasteurize the milk and at the same time inactivate the enzyme.

In summary, the requirements for satisfactory treatment of milk with pancreatic enzyme need only include, first, conditions of time and temperature with respect to the amount of enzyme material employed which would favor or permit the desired amount of modification of the milk by enzyme action and, secondly, conditions of time and temperature such as to bring about adequate inactivation of the enzymes. The limits of these conditions vary over a wide range as outlined above.

It is to be understood that certain specific embodiments of the invention have been set forth for purposes of illustration. It is also to be understood that various changes and modifications may be made therein as will be readily apparent to a person skilled in the art. The invention is only to be limited in accordance with the following claims.

What is claimed is:

1. The process of preparing a soft curd milk having a curd tension not exceeding about 30 grams, as measured by the Hill Curdometer, which consists in adding to the whole milk a small amount of pancreatic enzyme of the order of about 1 lb. of enzyme to about 5,000 to 40,000 of milk, depending upon the initial curd hardness in the raw milk and the activity of the enzyme, allowing the enzyme to act at a temperature between 32° F. and 70° F. for a period not exceeding 24 hours, then raising the temperature to 105° F. to 160° F. and holding the same at a controlled temperature in said last range for about fifteen minutes to retard the activity of the enzymes, and further heating to a higher temperature to completely inactivate said enzymes before substantial hydrolysis or digestion of the casein has occurred.

2. The process of preparing a soft curd milk having a curd tension not exceeding about 30 grams, as measured by the Hill Curdometer, which consists in adding to the whole milk a small amount of pancreatic enzyme of the order of about 1 lb. of enzyme to about 5,000 to 40,000 libs. of milk, depending upon the initial curd hardness in the raw milk and the activity of the enzyme, allowing the enzymes to act at a temperature between 32° F. and 70° F. for a period of time suited to reduce the hardness to a value not exceeding about 30 grams, then heating the milk to a temperature between 130° F. and 140° F. holding the same at a controlled temperature within said range for about 5 minutes to retard the activity of said enzymes and then further heating said milk to a higher temperature to completely inactivate said enzymes before substantial hydrolysis or digestion of the casein has occurred.

ARNOLD B. STORRS.